United States Patent
Iwamura et al.

(10) Patent No.: US 8,238,916 B2
(45) Date of Patent: Aug. 7, 2012

(54) MOBILE COMMUNICATION METHOD AND MOBILE STATION

(75) Inventors: Mikio Iwamura, Yokohama (JP); Shogo Yabuki, Yokosuka (JP); Kazunori Obata, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 12/989,918

(22) PCT Filed: Jun. 26, 2009

(86) PCT No.: PCT/JP2009/061748
§ 371 (c)(1),
(2), (4) Date: Dec. 8, 2010

(87) PCT Pub. No.: WO2009/157549
PCT Pub. Date: Dec. 30, 2009

(65) Prior Publication Data
US 2011/0086640 A1 Apr. 14, 2011

(30) Foreign Application Priority Data
Jun. 27, 2008 (JP) ................................ 2008-169686

(51) Int. Cl.
*H04W 36/00* (2009.01)
(52) U.S. Cl. ........ 455/436; 455/437; 455/438; 370/331; 370/332
(58) Field of Classification Search .................. 455/410, 455/411, 424, 450, 436, 437, 438, 439; 370/331, 370/332
See application file for complete search history.

(56) References Cited

U.S. PATENT DOCUMENTS

| | | | |
|---|---|---|---|
| 2006/0205386 A1* | 9/2006 | Yu et al. | 455/411 |
| 2008/0039096 A1* | 2/2008 | Forsberg | 455/438 |
| 2008/0139214 A1* | 6/2008 | Sun et al. | 455/450 |
| 2008/0160989 A1* | 7/2008 | Favre et al. | 455/424 |
| 2008/0240439 A1* | 10/2008 | Mukherjee et al. | 380/272 |
| 2009/0271623 A1* | 10/2009 | Forsberg et al. | 713/168 |
| 2010/0009656 A1* | 1/2010 | Pang et al. | 455/410 |
| 2010/0015982 A1* | 1/2010 | Wager et al. | 455/436 |

FOREIGN PATENT DOCUMENTS
WO 2009020789 A2 2/2009

OTHER PUBLICATIONS
International Search Report w/translation from PCT/JP2009/061748 dated Sep. 29, 2009 (3 pages).

(Continued)

*Primary Examiner* — Cong Tran
(74) *Attorney, Agent, or Firm* — Osha Liang LLP

(57) ABSTRACT

A mobile communication method according to the present invention is to communicate between a mobile station (UE) and a radio base station (eNB) by using a certain key generated using a first key. The mobile communication method includes the steps of: updating, at the mobile station (UE), the first key upon receiving a handover command signal from the radio base station (eNB); transmitting, from the mobile station (UE) to the radio base station (eNB), a handover complete signal by using the certain key generated using the updated first key; and performing, at the mobile station (UE), a cell selection processing when failing to transmit the handover complete signal and detecting a radio link failure, and transmitting, from the mobile station to a selected re-establishment target cell, a re-establishment request signal by using the first key before being updated.

4 Claims, 12 Drawing Sheets

OTHER PUBLICATIONS

Written Opinion from PCT/JP2009/061748 dated Sep. 29, 2009 (3 pages).
3GPP TSG RAN WG2 Meeting #60bis; R2-080138; "Handling of KeNb"; Motorola; Seville, Spain; Jan. 14-18, 2008 (3 pages).
3GPP TSG-RAN WG2 #61bis, R2-081699; "Security Handling During RLF"; Alcatel-Lucent; Shenzhen, China; Mar. 31-Apr. 4, 2008 (2 pages).
Extended European Search Report for Application No. 09770259.1, mailed on Mar. 23, 2011 (14 pages).
Nokia et al: "Shared Secret for RLF Recovery", 3GPP Draft; R2-073071; 3rd Generation Partnership Project (3GPP), Mobile Competence Centre; 650, Route Des Lucioles; F-06921 Sophia-Antipolis Cedex; France, vol. RAN WG2, no. Athens Greece; Aug. 20-24, 2007.
Rohde & Schwarz: "26.6.8.4—Support for Transmission of Access Bursts on the SACCH Added", 3GPP Draft; GP-061362, 3rd Generation Partnership Project (3GPP), Mobile Competence Centre; 650, Route Des Lucioles; F-06921 Sophia-Antipolis Cedex; France, vol. TSG GERAN, no. Lisbon Portugal; Jun. 26-30, 2006.
Ericcson: "AS Key Change on the Fly (after AKA)", 3GPP Draft; S3-080056; 3rd Generation Partnership Project (3GPP), Mobile Competence Centre; 650, Route Des Lucioles; F-06921 Sophia-Antipolis Cedex; France, vol. SA WG3, no. Sanya, China; Feb. 25-29, 2008.
Huawei: "IP Check Failure", 3GPP Draft; R2-084330, 3rd Generation Partnership Project (3GPP), Mobile Competence Centre; 650, Route Des Lucioles; F-06921 Sophia-Antipolis Cedex; France, no. Jeju, Korea; Aug. 18-22, 2008.
Qualcomm Europe: "AS Re-keying in Case of Inter-Cell Handover", 3GPP Draft; R2-090065; 3rd Generation Partnership Project (3GPP), Mobile Competence Centre; 650, Route Des Lucioles; F-06921 Sophia-Antipolis Cedex; France, no. Ljubljana, Solvenia, Jan. 12-16, 2009.
Office Action for European Application No. 09770259.1 dated Sep. 9, 2011 (9 pages).
3GPP TSG-RAN WG2 Meeting #62; R2-082161, "Clarifications/Corrections on Handover Procedure"; Kansas City, USA May 5-9, 2008 (10 pages).
Office Action for Chinese Application No. 200980117474.1 issued Feb. 14, 2012, with English translation thereof (9 pages).

* cited by examiner

MOBILE COMMUNICATION METHOD AND MOBILE STATION

TECHNICAL FIELD

The present invention relates to a mobile communication method for communicating between a mobile station and a radio base station using a certain key generated by using a first key, and also relates to a mobile station.

BACKGROUND ART

A conventional mobile communication system of the LTE (Long Term Evolution) scheme specified by the 3GPP is configured to communicate between a mobile station UE and a radio base station eNB using a certain key.

The certain key includes, for example, a key $K_{RRC\_Ciph}$ used for "Ciphering" in an RRC protocol, which is a C-plane protocol between the mobile station UE and the radio base station eNB (Access Stratum, AS), a key $K_{RRC\_IP}$ used for "Integrity Protection" in the RRC protocol, and a key $K_{UP\_Ciph}$ used for "Ciphering" in a U-plane protocol between the mobile station UE and the radio base station eNB (Access Stratum, AS) and the like. These certain keys are generated using a first key $K_{eNB}$.

Using the same key as any of the certain keys and the first key $K_{eNB}$ for a long time is not preferable, because it makes the system's security vulnerable. For this reason, a procedure for updating such a certain key or a first key $K_{eNB}$ during a handover procedure or a re-establishment procedure is being reviewed by the 3GPP.

The handover procedures and the re-establishment procedures presently being reviewed by the applicant are shown in FIG. 7 to FIG. 9. Specifically, FIG. 7 shows an Inter-eNB handover procedure (X2 handover procedure, handover procedure between different radio base stations), FIG. 8 shows an Intra-eNB re-establishment procedure (intra-radio base station re-establishment procedure), and FIG. 9 shows an Inter-eNB re-establishment procedure (re-establishment procedure between different radio base stations).

DISCLOSURE OF THE INVENTION

Problem to be Solved by the Invention

However, the above-mentioned Inter-eNB handover procedure has problems described below (refer to FIG. 7 and FIG. 10).

In the Inter-eNB handover procedure, when dedicated random access preambles (Dedicated RA Preamble) are used, a mobile station UE deletes configuration information of a handover source cell when the mobile station UE receives "MAC RA Response (RA response signal)" (in steps S5012 and S6012).

That is, at this point (in steps S5012 and S6012), the mobile station UE updates a first key to "$K_{eNB[n+1]}$" and deletes "$K_{eNB[n]}$".

Here, in step S6013, if a radio base station eNB#2 managing a handover target cell (handover target radio base station) fails to receive "RRC HO Complete (handover complete signal)", the handover target radio base station eNB#2 cannot acquire a first key $K_{eNB[n+2]}$ since "S1 Path Switch (path switch signal)" cannot be transmitted as shown in step S5015.

On the other hand, if a radio link failure (RLF) in the RRC connection is detected at this point (in step S6014), the mobile station UE updates the first key to "$K_{eNB[n+2]}$" in step S6016.

Then, in step S6020, the mobile station UE transmits "RRC Re-establishment Request (re-establishment request signal)" to the handover target radio base station eNB#2, by using the first key $K_{eNB[n+2]}$.

Here, even though "UE Context" of the mobile station UE is held in the handover target radio base station eNB#2, the handover target radio base station eNB#2 fails to verify the "RRC Re-establishment Request" in step S6021, and transmits "RRC Re-establishment Reject" to the mobile station UE in step S6022. As a result, the mobile station UE is in a state of "RRC_IDLE".

Similarly, the Intra-eNB re-establishment procedure and Inter-eNB re-establishment procedure also have the following problems (refer to FIG. 8, FIG. 9, FIG. 11, FIG. 12 and FIG. 13).

In the re-establishment procedures, upon receiving "RRC Re-establishment (re-establishment acknowledgement signal)" (in steps S5112, S5215, S6112, S6215 and S6315), the mobile station UE transmits "RRC Re-establishment Complete (re-establishment complete signal)" (in steps S5113, S5216, S6113, S6216 and S6316).

Here, in steps S6113, S6216 and S6316, if radio base stations eNB and eNB#2 managing a re-establishment target cell (re-establishment target radio base stations) fail to receive the "RRC Re-establishment Complete", the re-establishment target radio base station eNB#2 cannot acquire the first key $K_{eNB[n+2]}$ since "S1 Path Switch (path switch signal)" cannot be transmitted as shown in steps S5115 and S5218.

On the other hand, if a radio link failure in the RRC connection is detected at this point (in steps S56114, S6217 and S6317), the mobile station UE updates the first key to "$K_{eNB[n+2]}$" in steps S6116, S6219 and S6319.

Then, in steps S6120, S6223 and S6323, the mobile station UE transmits "RRC Re-establishment Request" to the re-establishment target radio base stations eNB and eNB#2, by using the first key $K_{eNB[n+2]}$.

Here, even though "UE Context" of the mobile station UE is held in the re-establishment target radio base stations eNB and eNB#2, the re-establishment target radio base stations eNB and eNB#2 fail to verify the "RRC Re-establishment Request" in steps S6121, S6224 and S6324, and transmit "RRC Re-establishment Reject" to the mobile station UE in steps S6122, S6225 and S6325. As a result, the mobile station UE is in a state of "RRC_IDLE".

Accordingly, the present invention has been made in view of the above problems and an object of the present invention is to provide a mobile communication method and a mobile station with which a re-establishment procedure can be performed successfully when a handover target radio base station holds "UE Context" even when the handover target radio base station fails to receive the "RRC HO Complete".

Furthermore, another object of the present invention is to provide a mobile communication method and a mobile station with which a re-establishment procedure can be performed successfully when a re-establishment target radio base station holds "UE Context", even when the re-establishment target radio base station fails to receive the "RRC Re-establishment Complete".

Solution to Problem

A first aspect of the present invention is summarized as a mobile communication method for communicating between a mobile station and a radio base station by using a certain key generated using a first key, the mobile communication method including the steps of: updating, at the mobile station, the first key upon receiving a handover command signal from the radio base station; transmitting, from the mobile station to the radio base station, a handover complete signal by using the certain key generated using the updated first key; and performing, at the mobile station, a cell selection processing when failing to transmit the handover complete signal and detecting a radio link failure, and transmitting, from the mobile station to a selected re-establishment target cell, a re-establishment request signal by using the first key before being updated.

In the first aspect, the handover command signal can be an RRC HO Command; the handover complete signal can be an RRC HO Complete; and the re-establishment request signal can be an RRC Re-establishment Request.

A second aspect of the present invention is summarized as a mobile station communicating with a radio base station by using a certain key generated using a first key, the mobile station including: an updating unit configured to update the first key, when receiving a handover command signal from the radio base station; a handover complete signal transmitter unit configured to transmit a handover complete signal to the radio base station using the certain key generated using the updated first key; and a re-establishment request signal transmitter unit configured to perform a cell selection processing when the handover complete signal fails to be transmitted and a radio link failure is detected, and then to transmit a re-establishment request signal to a selected re-establishment target cell by using the first key before being updated.

In the second aspect, the handover command signal can be an RRC HO Command; the handover complete signal can be an RRC HO Complete; and the re-establishment request signal can be an RRC Re-establishment Request.

As described above, according to the present invention, it is possible to provide a mobile communication method and a mobile station with which a re-establishment procedure can be performed successfully when a handover target radio base station holds "UE Context" even when the handover target radio base station fails to receive the "RRC HO Complete".

According to the present invention, a mobile communication method and a mobile station with which a re-establishment procedure can be performed successfully when a re-establishment target radio base station holds "UE Context", even when the re-establishment target radio base station fails to receive the "RRC Re-establishment Complete".

BEST MODES FOR CARRYING OUT THE INVENTION

Mobile Communication System According to First Embodiment of the Present Invention A mobile communication system according to a first embodiment of the present invention is described referring to FIG. 1 to FIG. 6.

The mobile communication system according to this embodiment is a mobile communication system to which the LTE scheme is applied, and includes a plurality of switching centers MME#1, MME#2, . . . and a plurality of radio base stations eNB#11, eNB#12, eNB#21, eNB#22, . . . .

For example, a mobile station UE is configured to communicate, in the cell #111 under the control of the radio base station eNB#11, with the radio base station eNB#11 by using a certain key described above.

Figure 1:
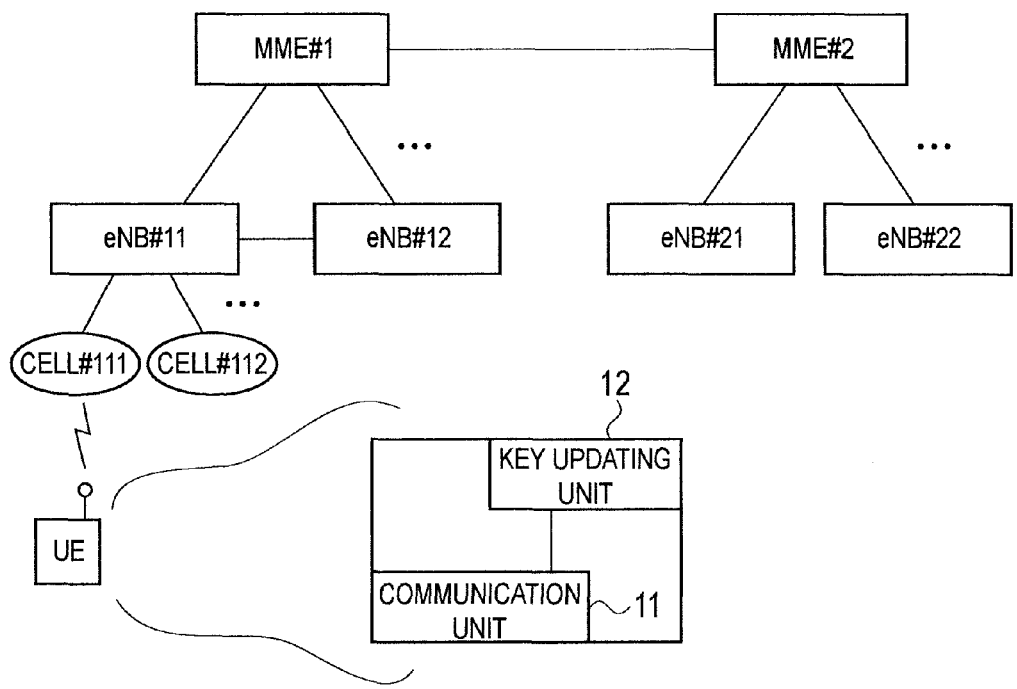
FIG. 1 is an overall configurational view of a mobile communication system according to a first embodiment of the present invention.

Furthermore, the mobile station UE includes a key updating unit 12 and a communication unit 11 as shown in FIG. 1.

The communication unit 11 is configured to transmit and receive a signal related to a handover procedure and a re-establishment procedure (for example, handover command signal, handover complete signal, re-establishment request signal, re-establishment acknowledgement signal, re-establishment complete signal, and the like).

The key updating unit 12 is configured to update the first key and certain keys described above at a predetermined timing.

For example, the key updating unit 12 is configured to update the first key $K_{eNB}$ when detecting a radio link failure after receiving "delivery acknowledgement information (RLC Status (RLC Ack) or HARQ Ack)" in response to "RRC HO Complete (handover complete signal)", and not to update the first key $K_{eNB}$, if a radio link failure is detected before receiving "delivery acknowledgement information (RLC Status (RLC Ack) or HARQ Ack)" in response to "RRC HO Complete (handover complete signal)".

Furthermore, the key updating unit 12 is configured to update the first key $K_{eNB}$ when detecting a radio link failure after receiving "delivery acknowledgement information (RLC Status (RLC Ack) or HARQ Ack)" in response to "RRC Re-establishment Complete (re-establishment complete signal)", and not to update the first key $K_{eNB}$ if a radio link failure is detected before receiving "delivery acknowledgement information (RLC Status (RLC Ack) or HARQ Ack)" in response to "RRC Re-establishment Complete (re-establishment complete signal)".

Furthermore, the key updating unit 12 is configured not to update the first key $K_{eNB}$ when a radio link failure is detected within a predetermined period of time following the start of the handover procedure.

On the other hand, the key updating unit 12 is configured to update the first key $K_{eNB}$, when no radio link failure is detected within a predetermined period of time following the start of the handover procedure.

Furthermore, the key updating unit 12 is configured not to update the first key $K_{eNB}$, when a radio link failure is detected within a predetermined period of time following the start of the re-establishment procedure.

On the other hand, the key updating unit 12 is configured to update the first key $K_{eNB}$, when no radio link failure is detected within a predetermined period of time following the start of the re-establishment procedure.

Here, the predetermined time period may be counted by a timer which is configured to start counting from the time when "RRC HO Command (handover command signal)" or "RRC Re-establishment (re-establishment acknowledgement signal)" is received.

Figure 2:
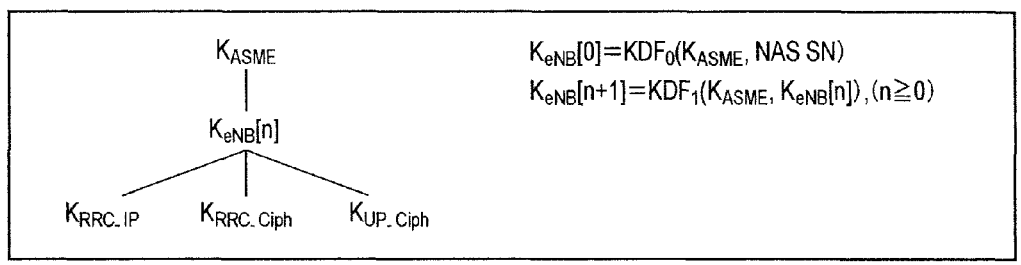
FIG. 2 is a diagram showing an example of a hierarchical structure and a calculation procedure of a key used in the mobile communication system according to the first embodiment of the present invention.

FIG. 2 shows an exemplary hierarchical structure and calculation procedure of keys used in the mobile communication system according to this embodiment (that is, keys used for calculating certain keys).

As shown in FIG. 2, a key $K_{RRC\_IP}$ used for "Integrity Protection" in the RRC protocol, a key $K_{RRC\_Ciph}$ used for "Ciphering" in the RRC protocol, and a key $K_{UP\_Ciph}$ used for "Ciphering" in the U-plane of AS are generated using a first key $K_{eNB[n]}$.

Furthermore, the first key $K_{eNB[n]}$ is calculated from the formulas given below using the master key $K_{ASME}$.

$$K_{eNB[0]} = KDF_0(K_{ASME}, \text{NAS SN})$$

$$K_{eNB[n+1]} = KDF_1(K_{ASME}, K_{eNB[n]}), (n \geq 0)$$

Here, the master key $K_{ASME}$ is known to the mobile station UE and the switching center MME only, and must not be known to the radio base station eNB.

Furthermore, the NAS SN is a sequence number (SN) of a NAS (Non Access Stratum, NAS) protocol which is a C-plane protocol between the mobile station UE and the switching center MME.

Hereafter, operations in the mobile communication system according to this embodiment are described referring to FIG. 3 to FIG. 6.

Figure 3:
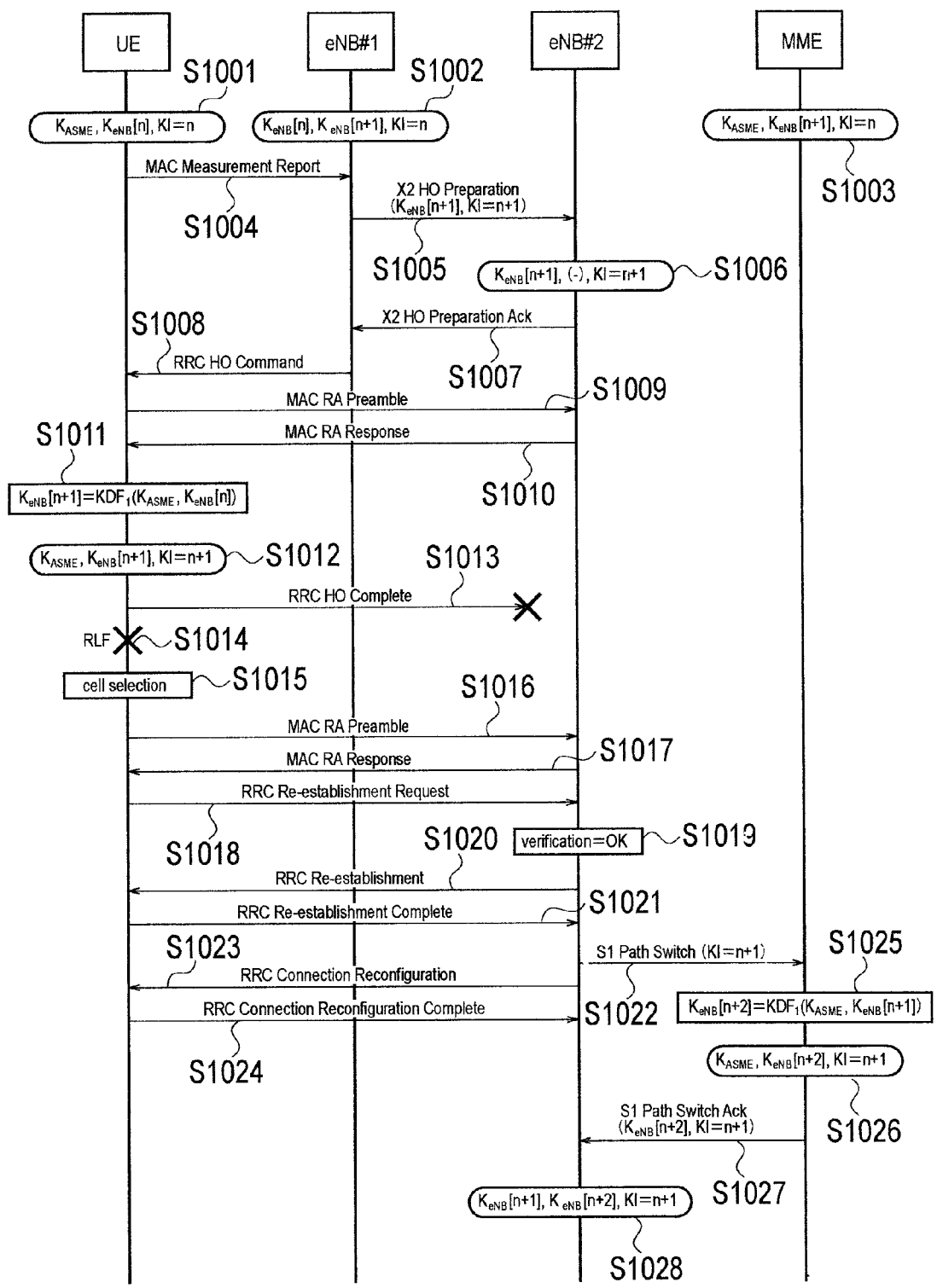
FIG. 3 is a sequence diagram showing operations in the mobile communication system according to the first embodiment of the present invention.

First, operations in a re-establishment procedure following an occurrence of a radio link failure in an X2 handover procedure (handover procedure between different radio base stations) in the mobile communication system according to this embodiment are described referring to FIG. 3.

As shown in FIG. 3, before starting the X2 handover procedure, the mobile station UE holds $K_{ASME}$, $K_{eNB[n]}$ and "KI (=n)" (in step S1001), the radio base station eNB#1 managing a handover source call (handover source radio base station) holds $K_{eNB[n]}$, $K_{eNB[n+1]}$ and "KI (=n)" (in step S1002), and a switching center MME holds $K_{ASME}$, $K_{eNB[n+1]}$ and "KI (=n)" (in step S1003).

In step S1004, if predetermined conditions are satisfied, the mobile station UE transmits "RRC Measurement Report (measurement report signal)" to the handover source radio base station eNB#1.

In step S1005, the handover source radio base station eNB#1 transmits "X2 HO Preparation (handover preparation signal)" including $K_{eNB[n+1]}$ and "KI (=n+1)" to the handover target radio base station eNB#2.

In step S1006, the handover target radio base station eNB#2 stores the received $K_{eNB[n+1]}$ and "KI (=n+1)", and in step S1007, transmits "X2 HO Preparation Ack (handover preparation acknowledgement signal)" to the handover source radio base station eNB#1.

In step S1008, the handover source radio base station eNB#1 transmits "RRC HO Command (handover command signal)" to the mobile station UE.

In step S1009, the mobile station UE transmits "MAC RA Preamble" to the handover target radio base station eNB#2, and in step S1010, the mobile station UE receives "MAC RA Response" from the handover target radio base station eNB#2.

Upon receiving the "MAC RA Response", the mobile station UE calculates $K_{eNB[n+1]}$ from the formula given below in step S1011.

$$K_{eNB[n+1]} = KDF_1(K_{ASME}, K_{eNB[n]})$$

In step S1012, the mobile station UE stores $K_{eNB[n]}$ together with $K_{eNB[n+1]}$ and "KI (=n+1)", since the delivery acknowledgement information "RLC Status (RLC Ack) or HARQ Ack" in response to "RRC HO Complete (handover complete signal)" is not yet received or the timer is not yet terminated.

In step S1013, the mobile station UE transmits "RRC HO Complete" to the handover target radio base station eNB#2 by using $K_{eNB[n+1]}$ but the "RRC HO Complete" does not reach the handover target radio base station eNB#2.

In step S1014, the mobile station UE detects a radio link failure in the above-mentioned RRC connection. For example, the mobile station UE is assumed to detect the radio link failure in the following cases.

When RSRP (Reference Signal Received Power) in the RRC connection remains lower than a predetermined threshold for a predetermined period of time.

When the random access procedure is not successful.

When the handover procedure fails.

Thereafter, in step S1015, the mobile station UE performs cell selection processing, and in step S1016, the mobile station UE transmits "MAC RA Preamble" to a selected re-establishment target cell (or the re-establishment target radio base station eNB#2 managing the selected re-establishment target cell), and in step S1017, the mobile station UE receives "MAC RA Response" from the re-establishment target radio base station eNB#2.

In step S1018, the mobile station UE transmits "RRC Connection Re-establishment Request (re-establishment request signal)" to the re-establishment target radio base station eNB#2 by using the first key $K_{eNB[n+1]}$ before being updated.

In step S1019, the re-establishment target radio base station eNB#2, which holds the "UE context" of the mobile station UE in advance, checks the validity of the received "RRC Connection Re-establishment Request".

In step S1020, the re-establishment target radio base station eNB#2 transmits "RRC Connection Re-establishment (RRC connection Re-establishment acknowledgement signal)" to the mobile station UE. In step S1021, the mobile station UE transmits "RRC Connection Re-establishment Complete (RRC connection re-establishment complete signal)" to the re-establishment target radio base station eNB#2.

In step S1022, the re-establishment target radio base station eNB#2 transmits "S1 Path Switch (path switch signal)" to the switching center MME. This "S1 Path Switch (path switch signal)" may include "KI (=n+1)".

In step S1023, the re-establishment target radio base station eNB#2 transmits "RRC Connection Reconfiguration" to the mobile station UE. In step S1024, the mobile station UE transmits "RRC Connection Reconfiguration Complete" to the re-establishment target radio base station eNB#2.

In step S1025, the switching center MME calculates $K_{eNB[n+2]}$ from the formula given below, in step S1025, stores $K_{ASME}$, $K_{eNB[n+2]}$ and "KI (=n+1)", and in step S1026, transmits "S1 Path Switch Ack (path switch acknowledgement signal)" to the re-establishment target radio base station eNB#2.

$$K_{eNB[n+2]}=KDF_1(K_{ASME},K_{eNB[n+1]})$$

In step S2028, the re-establishment target radio base station eNB#2 stores $K_{eNB[n+1]}$, $K_{eNB[n+2]}$ and "KI (=n+1)".

Figure 4:
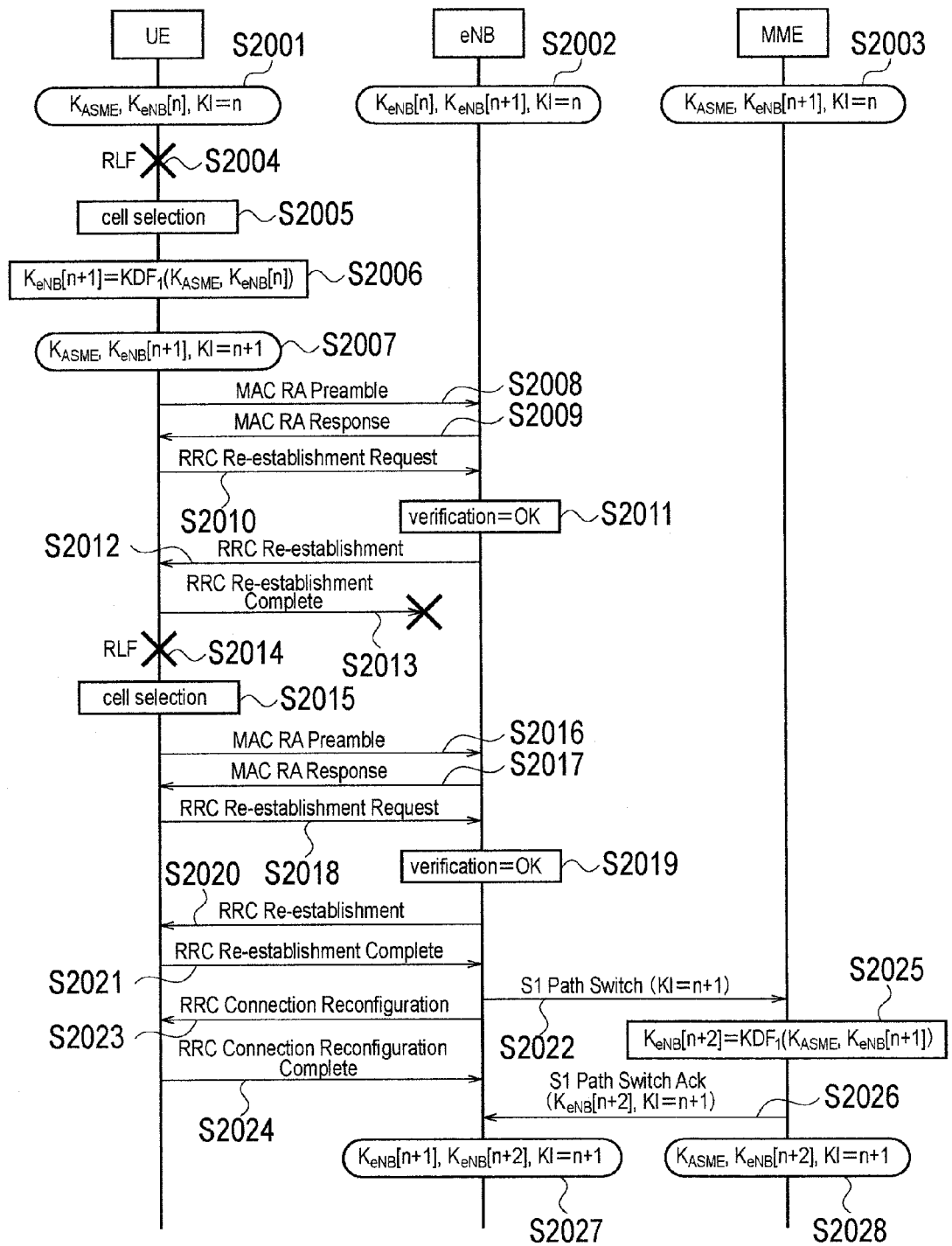
FIG. 4 is a sequence diagram showing operations in the mobile communication system according to the first embodiment of the present invention.

Secondly, operations in the mobile communication system according to this embodiment are described referring to FIG. 4 in which the Intra-eNB re-establishment procedure (inter-radio base station re-establishment procedure) is re-performed following an occurrence of a radio link failure in the Intra-eNB re-establishment procedure.

As shown in FIG. 4, before starting the Intra-eNB re-establishment procedure, the mobile station UE holds $K_{ASME}$, $K_{eNB[n]}$ and "KI (=n)" (in step S2001), the radio base station eNB holds $K_{eNB[n]}$, $K_{eNB[n+1]}$ and "KI (=n)" (in step S2002), and the switching center MME holds $K_{ASME}$, $K_{eNB[n+1]}$, and "KI (=n)" (in step S2003).

In step S2004, where the RRC connection has been established between the mobile station UE and the radio base station eNB, and the S1 connection has been established between the radio base station eNB and the switching center MME, the mobile station UE detects a radio link failure in the RRC connection described above.

Then, in step S2005, the mobile station UE performs cell selection processing, and in step S2006, calculates $K_{eNB[n+1]}$ from the formula given below.

$$K_{eNB[n+1]}=KDF_1(K_{ASME},K_{eNB[n]})$$

Here, the mobile station UE holds $K_{ASME}$, $K_{eNB[n+1]}$ and "KI (=n+1)" (in step S2007).

In step S2008, the mobile station UE transmits "MAC RA Preamble" to a selected re-establishment target cell (or the re-establishment target radio base station eNB managing the selected re-establishment target cell), and in step S2009, the mobile station UE receives "MAC RA Response" from the re-establishment target radio base station eNB.

In step S2010, the mobile station UE transmits "RRC Connection Re-establishment Request" to the re-establishment target radio base station eNB, by using the updated first key $K_{eNB[n+1]}$.

In step S2011, the re-establishment target radio base station eNB, which holds the "UE context" of the mobile station in advance, checks the validity of the received "RRC Connection Re-establishment Request".

In step S2012, the re-establishment target radio base station eNB transmits "RRC Connection Re-establishment" to the mobile station UE.

In step S2013, the mobile station UE transmits "RRC Connection Re-establishment Complete" to the re-establishment target radio base station eNB, but the "RRC Connection Re-establishment Complete" does not reach the handover target radio base station eNB.

In step S2014, the mobile station UE detects a radio link failure in the above-mentioned RRC connection.

Thereafter, in step S2015, the mobile station UE performs cell selection processing, and in step S1016, the mobile station UE transmits "MAC RA Preamble" to a selected re-establishment target cell (or the re-establishment target radio base station eNB managing the selected re-establishment target cell), and in step S2016, the mobile station UE receives "MAC RA Response" from the re-establishment target radio base station eNB.

In step S2018, the mobile station UE transmits "RRC Connection Re-establishment Request" to the re-establishment target radio base station eNB, by using the updated first key $K_{eNB[n+1]}$.

In step S2019, the re-establishment target radio base station eNB, which holds the "UE context" of the mobile station UE in advance, checks the validity of the received "RRC Connection Re-establishment Request".

In step S2020, the re-establishment target radio base station eNB transmits "RRC Connection Re-establishment" to the mobile station UE.

In step S2021, the mobile station UE transmits "RRC Connection Re-establishment Complete" to the re-establishment target radio base station eNB.

In step S2022, the re-establishment target radio base station eNB transmits "S1 Path Switch" to the switching center MME. This "S1 Path Switch" may include "KI (=n+1)".

In step S2023, the re-establishment target radio base station eNB transmits "RRC Connection Reconfiguration" to the mobile station UE, and in step S2024, the mobile station UE transmits "RRC Connection Reconfiguration Complete" to the re-establishment target radio base station eNB.

In step S2025, the switching center MME calculates $K_{eNB[n+2]}$ from the formula give below, and in step S2026, the switching center MME transmits "S1 Patch Switch Ack" including $K_{eNB[n+2]}$ and "KI (=n+1)" to the re-establishment target radio base station eNB.

$$K_{eNB[n+2]}=KDF_1(K_{ASME},K_{eNB[n+1]})$$

Here, in step S2027, the re-establishment target radio base station eNB holds $K_{eNB[n+1]}$, $K_{eNB[n+2]}$ and "KI (=n+1)", and in step S2028, the switching center MME holds $K_{ASME}$, $K_{eNB[n+2]}$ and "KI (=n+1)".

Figure 5:
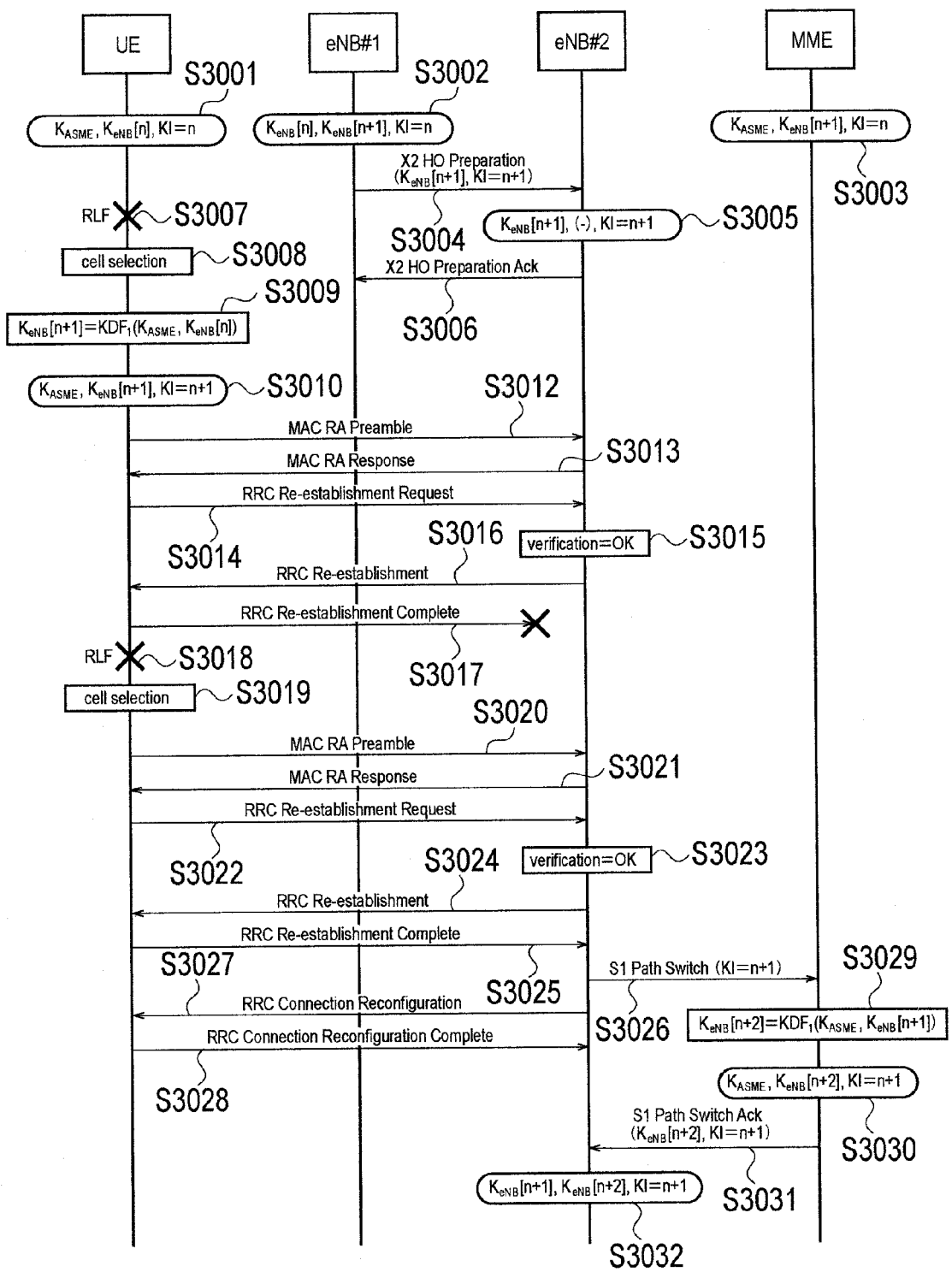
FIG. 5 is a sequence diagram showing operations in the mobile communication system according to the first embodiment of the present invention.

Thirdly, operations in the mobile communication system according to this embodiment are described referring to FIG. 5 in which the Inter-eNB (re-establishment procedure between different radio base stations) re-establishment procedure is re-performed following an occurrence of a radio link failure in the Inter-eNB re-establishment procedure.

As shown in FIG. 5, before starting the Inter-eNB re-establishment procedure, the mobile station UE holds $K_{ASME}$, $K_{eNB[n]}$ and "KI (=n)" (in step S3001), the radio base station eNB#1 holds $K_{eNB[n]}$, $K_{eNB[n+1]}$ and "KI (=n)" (in step S3002), and the switching center MME holds $K_{ASME}$, $K_{eNB[n+1]}$ and "KI (=n)" (in step S3003).

In step S3004, the radio base station eNB#1 transmits, to the neighboring radio base station eNB#2, "X2 HO Preparation (handover preparation signal)" including $K_{eNB[n+1]}$ and "KI (=n+1)".

In step S3005, the radio base station eNB#2 stores the received $K_{eNB[n+1]}$ and "KI (=n+1)", and in step S3006, transmits "X2 HO Preparation Ack (handover preparation acknowledgement signal)" to the radio base station eNB#1.

In step S3007, where the RRC connection has been established between the mobile station UE and the radio base station eNB#1, and the S1 connection has been established between the radio base station eNB#1 and the switching center MME, the mobile station UE detects a radio link failure in the above-mentioned RRC connection.

Then, in step S3008, the mobile station UE performs cell selection processing, and in step S3009, calculates $K_{eNB[n+1]}$ from the formula given below.

$$K_{eNB[n+1]}=KDF_1(K_{ASME},K_{eNB[n]})$$

Here, the mobile station UE holds $K_{ASME}$, $K_{eNB[n+1]}$ and "KI (=n+1)" (in step S3010).

In step S3012, the mobile station UE transmits "MAC RA Preamble" to a selected re-establishment target cell (or the re-establishment target radio base station eNB#2 managing the selected re-establishment target cell), and in step S3013, the mobile station UE receives "MAC RA Response" from the re-establishment target radio base station eNB#2.

In step S3014, the mobile station UE transmits "RRC Connection Re-establishment Request" to the re-establishment target radio base station eNB#2, by using the updated first key $K_{eNB[n+1]}$.

In step S3015, the re-establishment target radio base station eNB#2, which holds the "UE context" of the mobile station UE in advance, checks the validity of the received "RRC Connection Re-establishment Request".

In step S3016, the re-establishment target radio base station eNB#2 transmits "RRC Connection Re-establishment" to the mobile station UE.

In step S3017, the mobile station UE transmits "RRC Connection Re-establishment Complete" to the re-establishment target radio base station eNB, but the "RRC Connection Re-establishment Complete" does not reach the handover target radio base station eNB.

In step S3018, the mobile station UE detects a radio link failure in the RRC connection described above.

Hereafter, operations in steps S3019 to S3032 are same as operations in steps S1015 to S1028 shown in FIG. 3.

Figure 6:
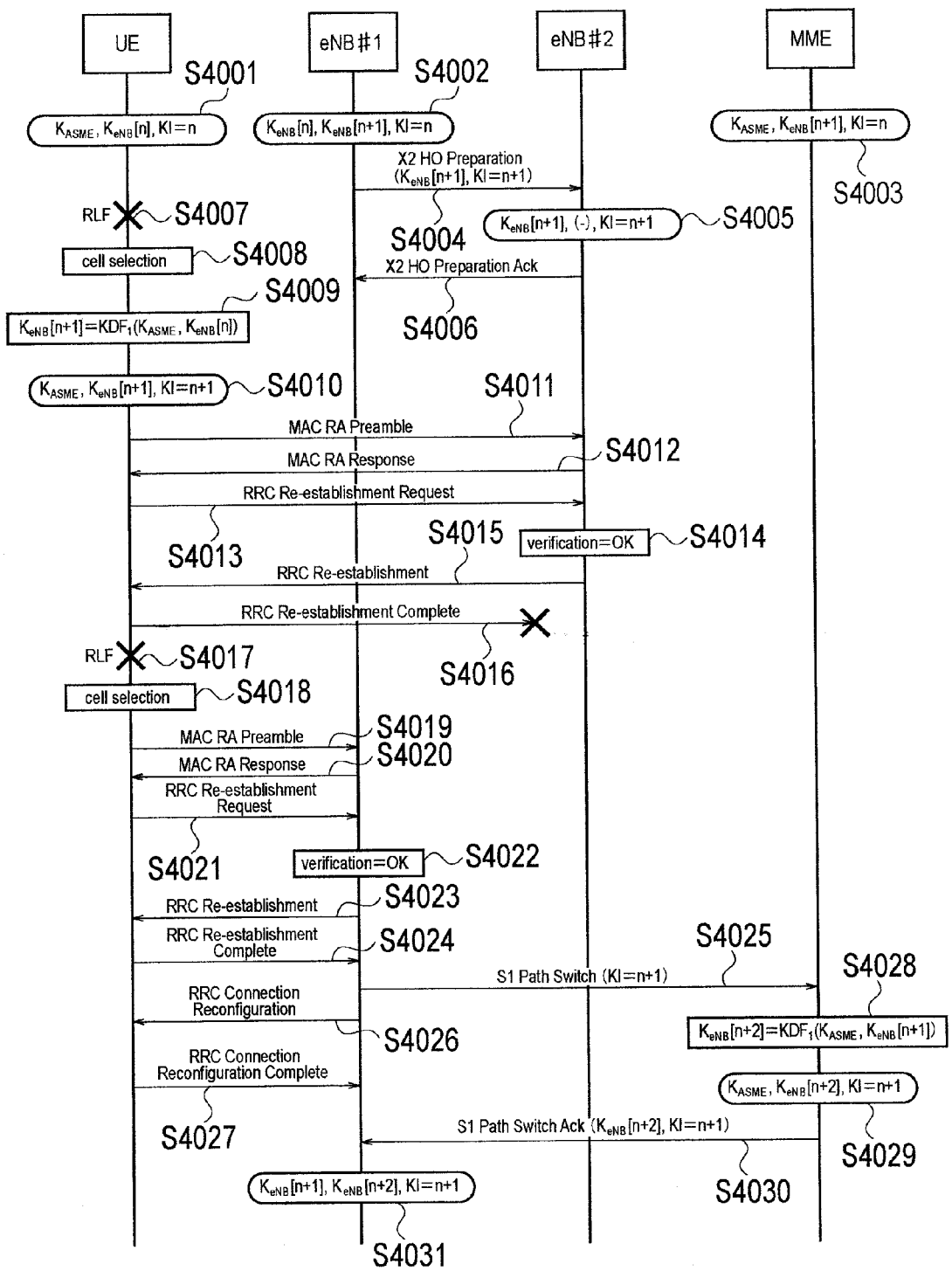
FIG. 6 is a sequence diagram showing operations in the mobile communication system according to the first embodiment of the present invention.
Figure 7:
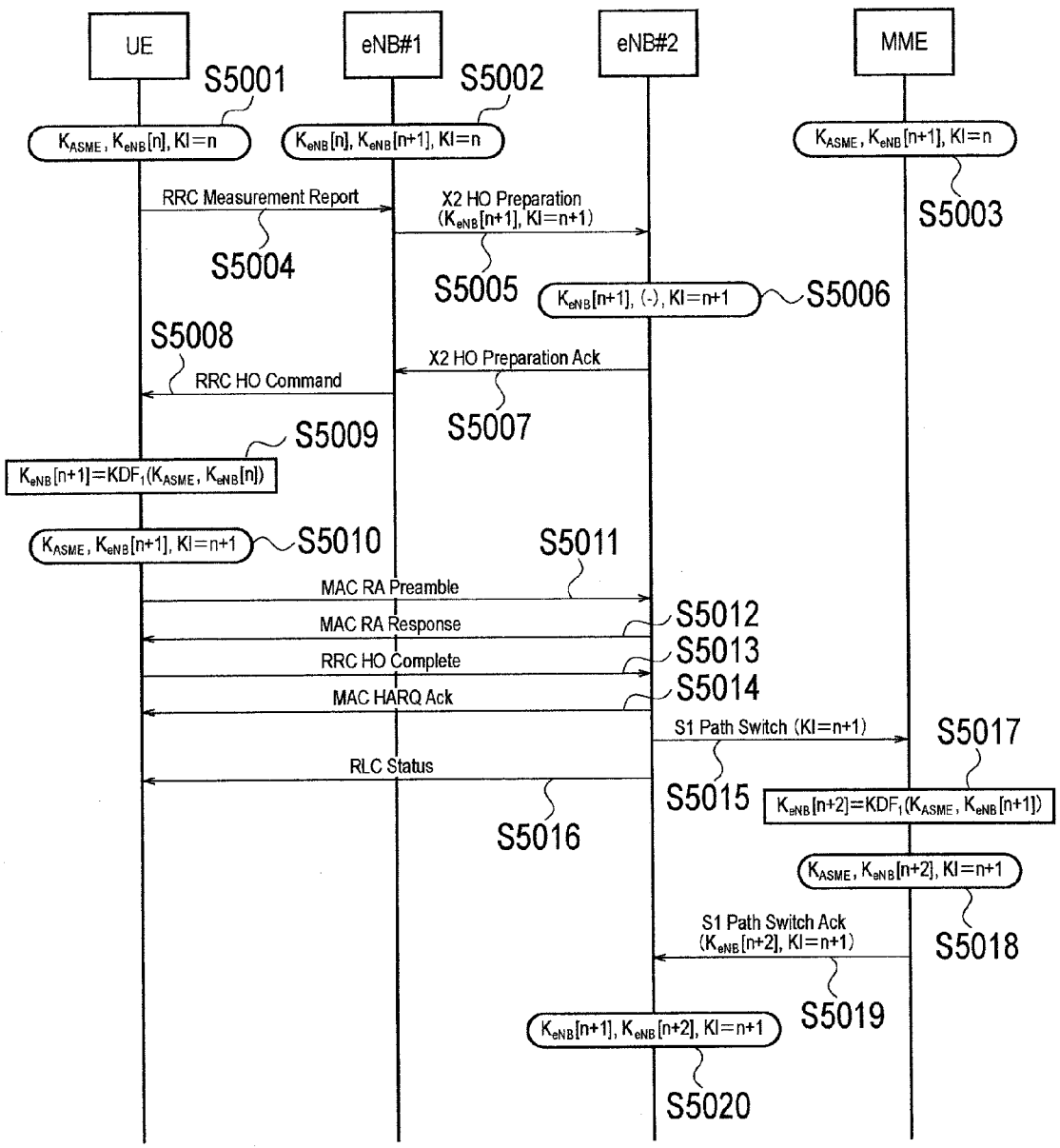
FIG. 7 is a sequence diagram showing operations in a conventional mobile communication system.
Figure 8:
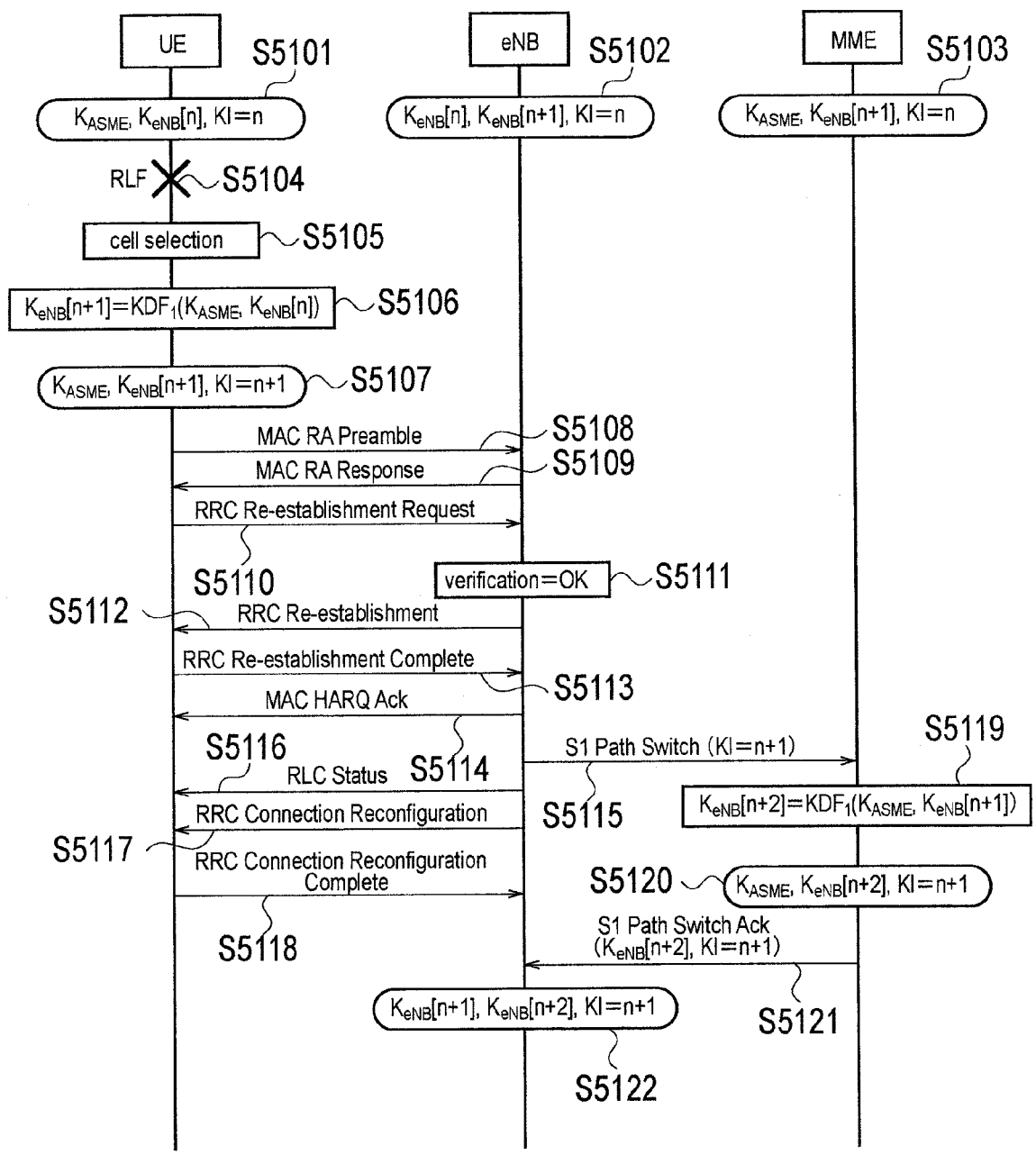
FIG. 8 is a sequence diagram showing operations in the conventional mobile communication system.
Figure 9:
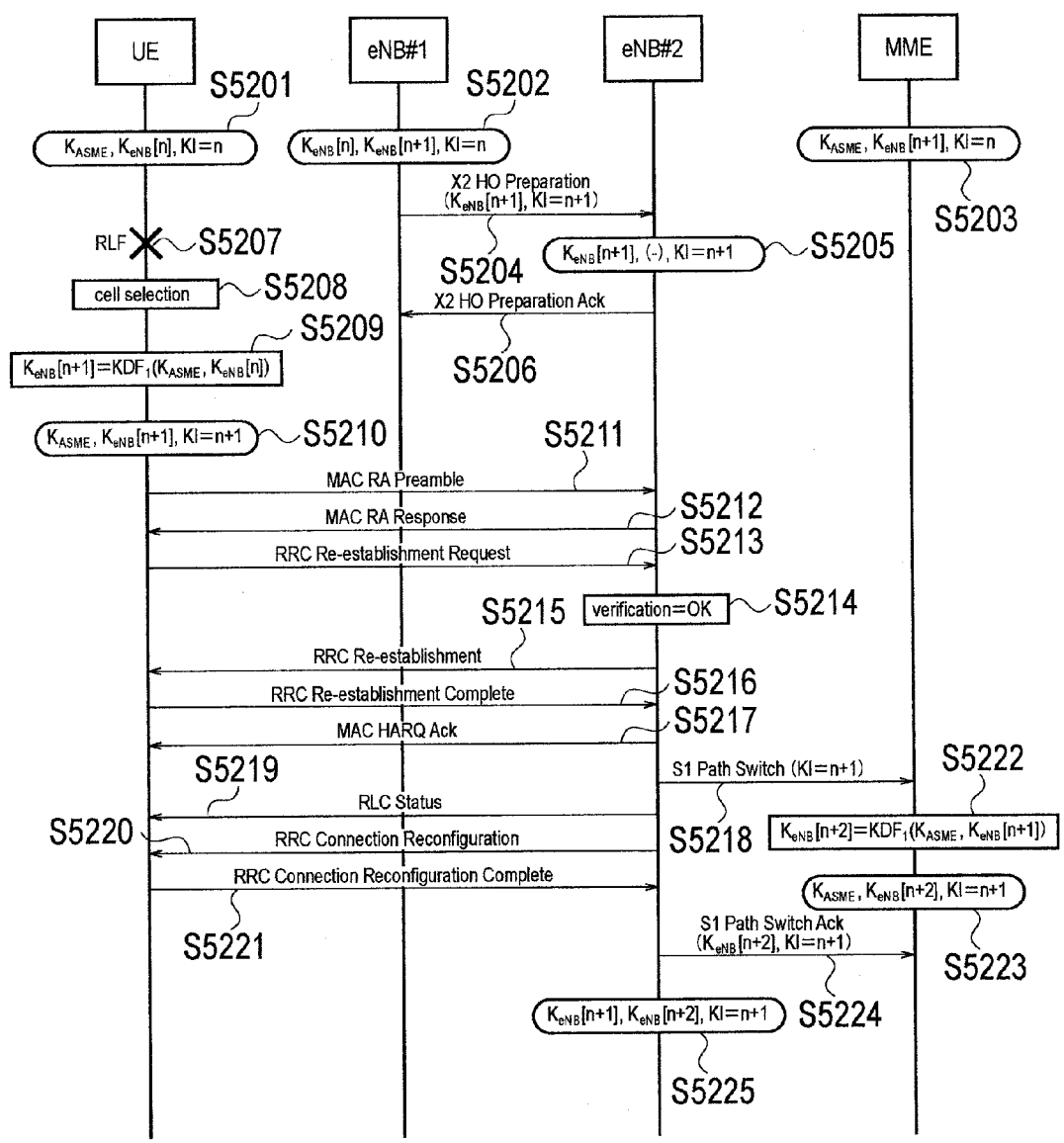
FIG. 9 is a sequence diagram showing operations in the conventional mobile communication system.
Figure 10:
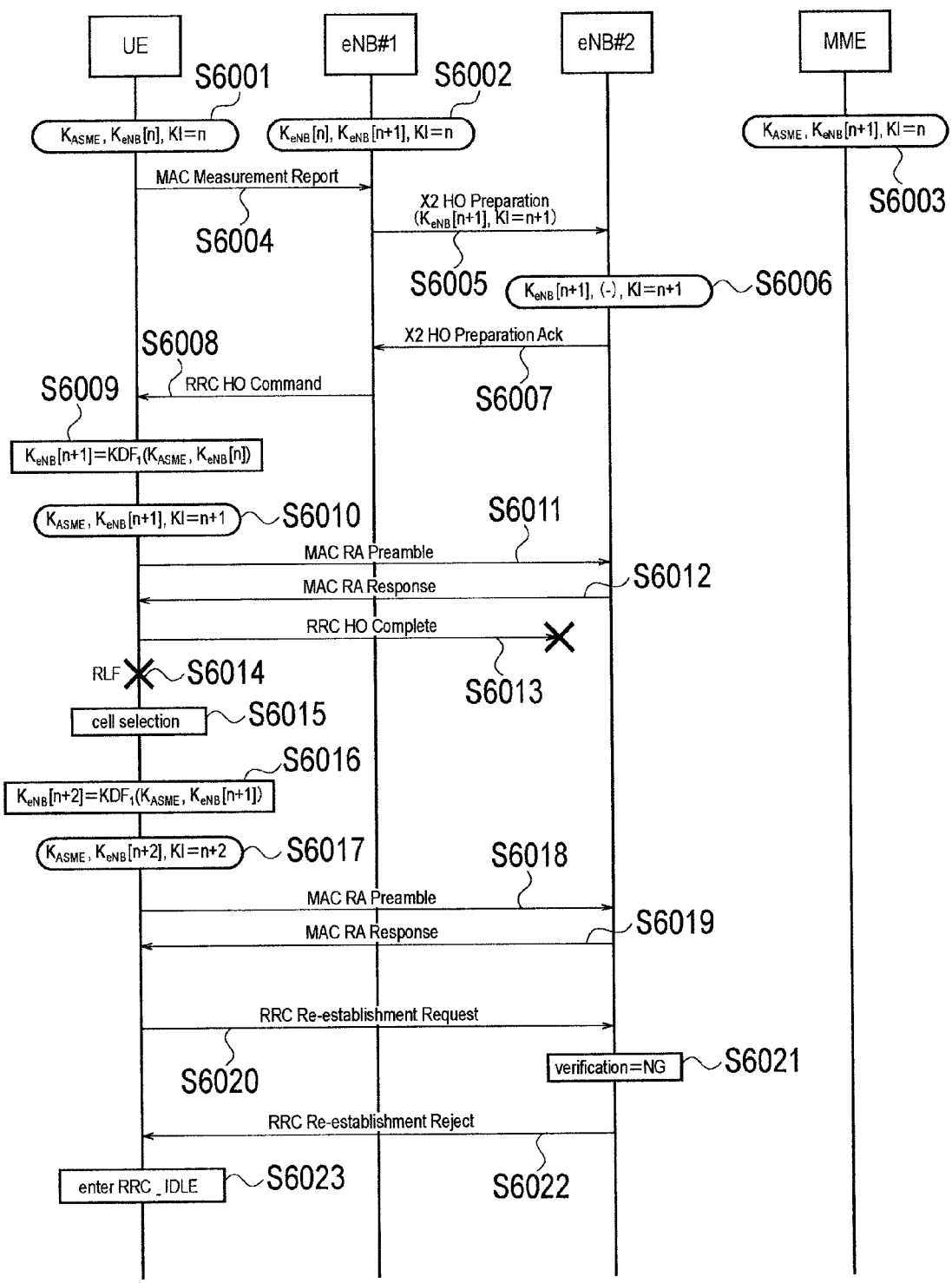
FIG. 10 is a sequence diagram for illustrating problems with the conventional mobile communication system.
Figure 11:
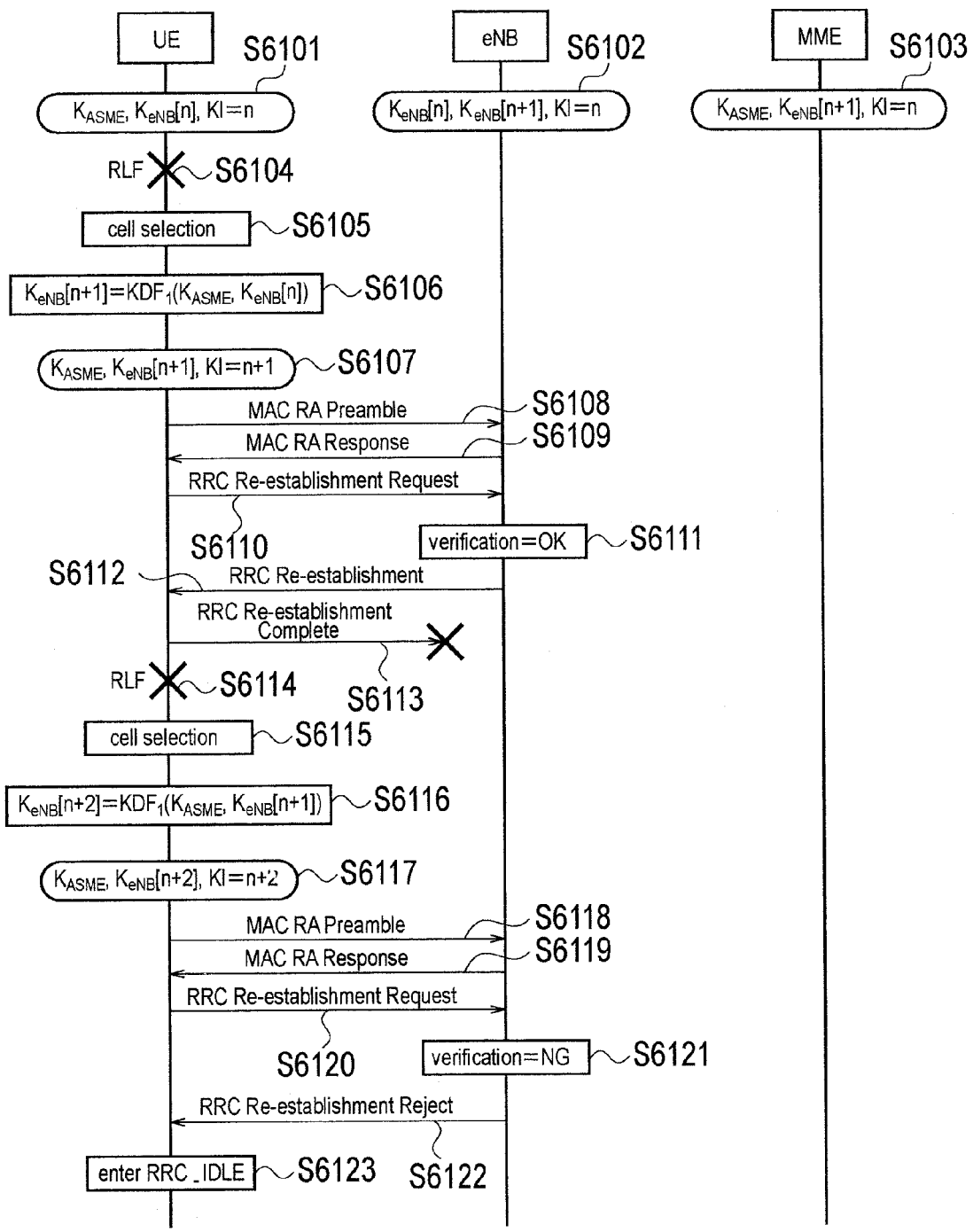
FIG. 11 is a sequence diagram for illustrating problems with the conventional mobile communication system.
Figure 12:
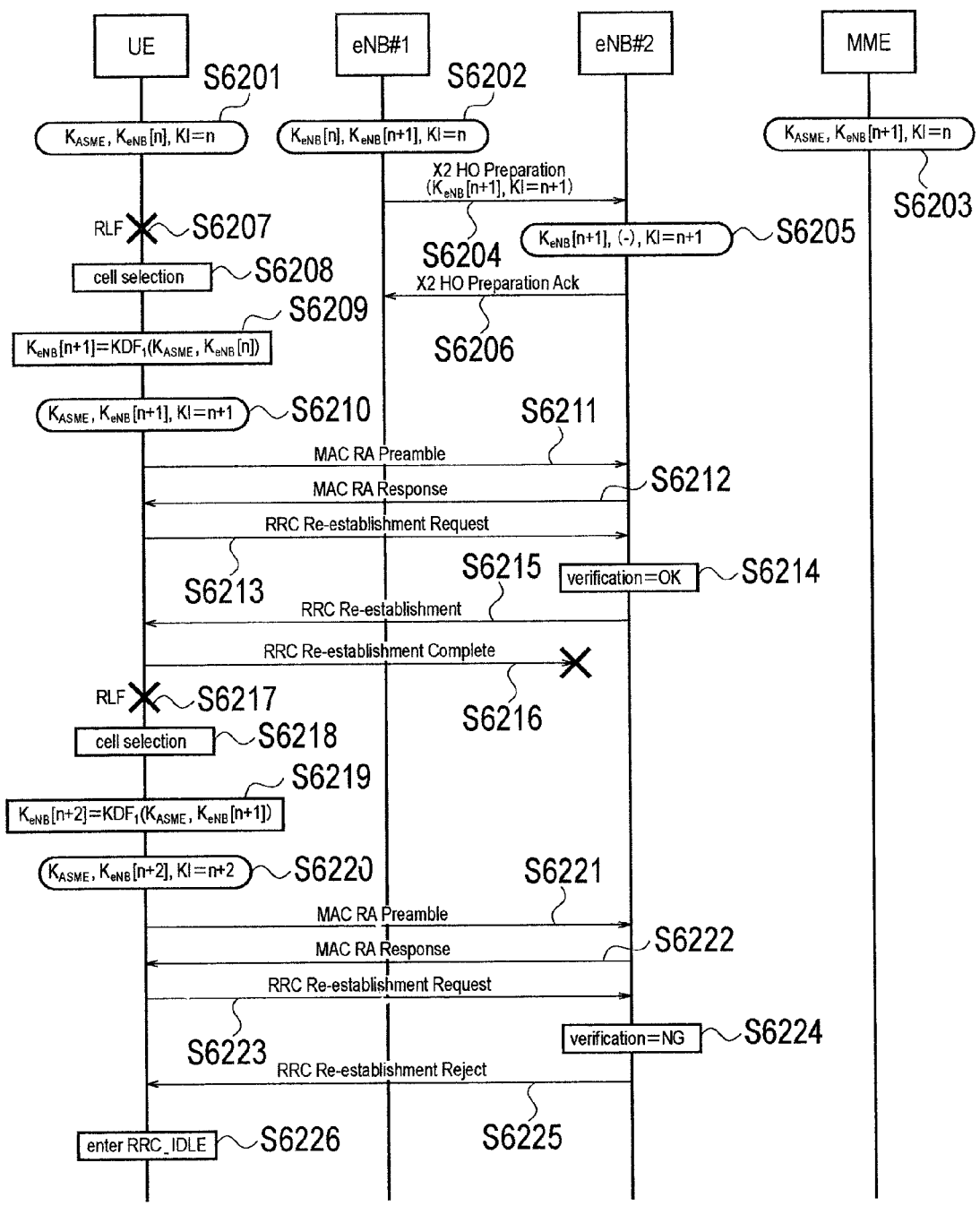
FIG. 12 is a sequence diagram for illustrating problems with the conventional mobile communication system.
Figure 13:
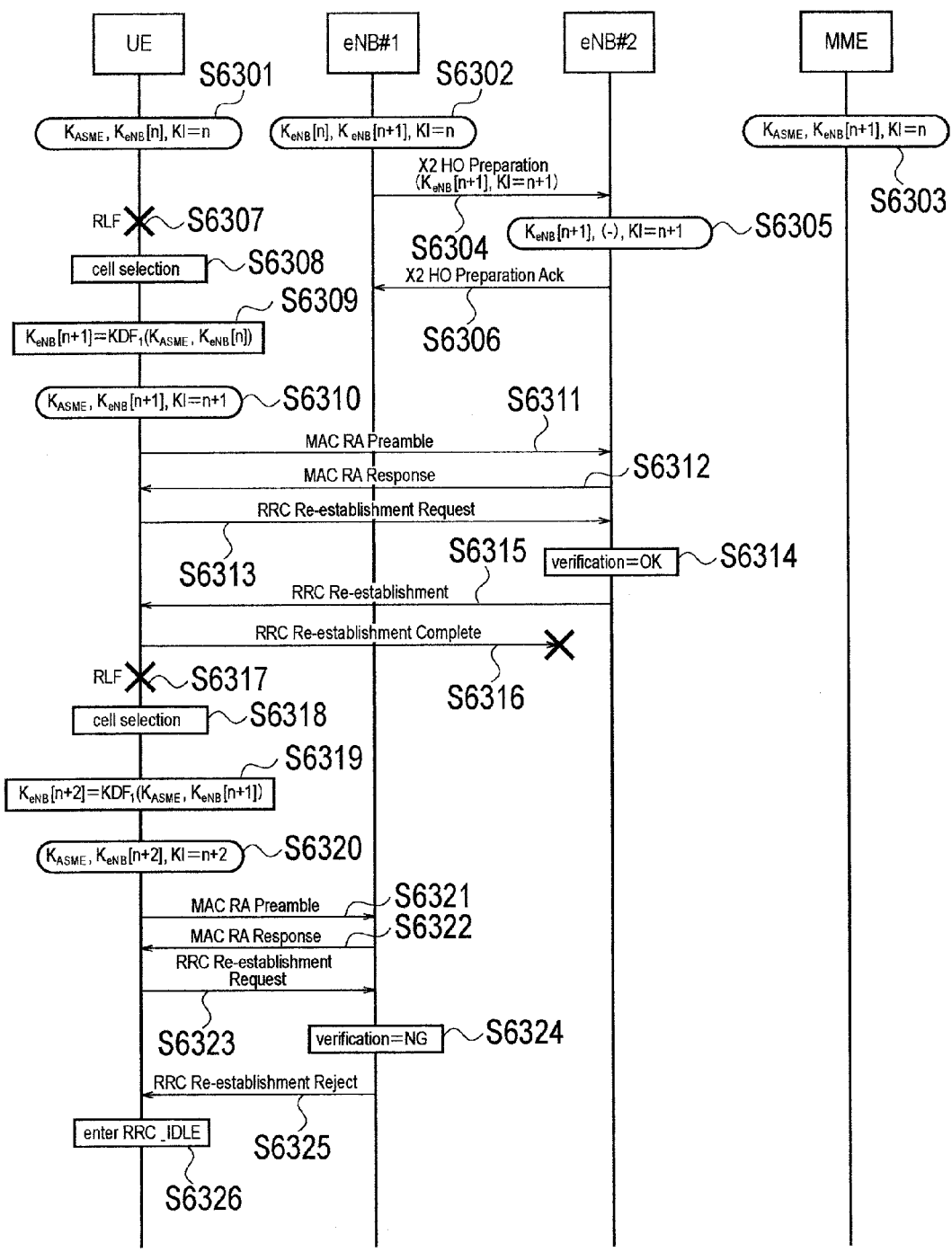
FIG. 13 is a sequence diagram for illustrating problems with the conventional mobile communication system.

Fourthly, operations in the mobile communication system according to this embodiment are described referring to FIG. 6 in which the Intra-eNB re-establishment procedure (re-establishment procedure between different radio base stations) is performed following the occurrence of a radio link failure in the Inter-eNB re-establishment procedure.

As shown in FIG. 6, operations in steps S4001 to S4017 are same as operations in steps S3001 to S3018 shown in FIG. 5.

Furthermore, operations in steps S4018 to S4031 are same as operations in steps S2015 to S2018 shown in FIG. 4.

Advantageous Effects of Mobile Communication System According to First Embodiment of the Present Invention In the mobile communication system according to the first embodiment of the present invention, when the handover target radio base station eNB#2 holds the "UE Context", the re-establishment procedure can be performed successfully even when the handover target radio base station eNB#2 fails to receive the "RRC HO Complete".

Furthermore, in the mobile communication system according to the first embodiment of the present invention, the re-establishment procedure can be performed successfully when the re-establishment target radio base station eNB#2 holds the "UE Context", even when the re-establishment target radio base station eNB#2 fails to receive the "RRC Re-establishment Complete".

Modification

Note that operation of the above described switching center MME, the radio base station eNB and the mobile station UE may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the switching center MME, the radio base station eNB and the mobile station UE. Also, the storage medium and the processor may be provided in the switching center MME, the radio base station eNB and the mobile station UE as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication method for communicating between a mobile station and a radio base station by using a certain key generated using a first key, the mobile communication method comprising the steps of:
    updating, at the mobile station, the first key upon receiving a handover command signal from the radio base station;
    transmitting, from the mobile station to the radio base station, a handover complete signal by using the certain key generated using the updated first key; and
    performing, at the mobile station, a cell selection processing when failing to transmit the handover complete signal and detecting a radio link failure, and transmitting, from the mobile station to a selected re-establishment target cell, a re-establishment request signal by using the first key before being updated.

2. The mobile communication method according to claim 1, wherein
    the handover command signal is an RRC HO Command;
    the handover complete signal is an RRC HO Complete; and
    the re-establishment request signal is an RRC Re-establishment Request.

3. A mobile station communicating with a radio base station by using a certain key generated using a first key, the mobile station comprising:
    an updating unit configured to update the first key, when receiving a handover command signal from the radio base station;
    a handover complete signal transmitter unit configured to transmit a handover complete signal to the radio base station using the certain key generated using the updated first key; and
    a re-establishment request signal transmitter unit configured to perform a cell selection processing when the handover complete signal fails to be transmitted and a radio link failure is detected, and then to transmit a re-establishment request signal to a selected re-establishment target cell by using the first key before being updated.

4. The mobile station according to claim 3, wherein
    the handover command signal is an RRC HO Command;
    the handover complete signal is an RRC HO Complete; and
    the re-establishment request signal is an RRC Re-establishment Request.

* * * * *